United States Patent [19]

Skotheim et al.

[11] Patent Number: 5,529,860
[45] Date of Patent: Jun. 25, 1996

[54] ELECTROACTIVE HIGH STORAGE CAPACITY POLYACETYLENE-CO-POLYSULFUR MATERIALS AND ELECTROLYTIC CELLS CONTAINING SAME

[75] Inventors: Terje A. Skotheim, Shoreham, N.Y.; Boris Trofimov; Anastasiya G. Malkina, both of Irkutsk, Russian Federation; Igor P. Koralev, Setauket, N.Y.

[73] Assignee: Moltech Corporation, Tuscon, Ariz.

[21] Appl. No.: 477,106

[22] Filed: Jun. 7, 1995

[51] Int. Cl.⁶ .............................. H01M 4/02; H01M 4/60
[52] U.S. Cl. ..................... 429/213; 429/190; 429/192; 429/212
[58] Field of Search .................... 429/212, 213, 429/190, 191, 192, 194, 218; 252/500, 182.1

[56] References Cited

U.S. PATENT DOCUMENTS

| | | | |
|---|---|---|---|
| 4,143,214 | 3/1979 | Chang et al. | 429/112 |
| 4,152,491 | 5/1979 | Chang et al. | 429/112 |
| 4,664,991 | 5/1987 | Perichaud et al. | 429/194 |
| 4,917,974 | 4/1990 | De Joughe et al. | 429/213 X |
| 5,441,831 | 8/1995 | Okamoto et al. | 429/213 |
| 5,460,905 | 10/1995 | Skotheim | 429/213 |
| 5,462,566 | 10/1995 | Skotheim | 429/212 X |

*Primary Examiner*—Anthony Skapars
*Attorney, Agent, or Firm*—Roland Plottel

[57] ABSTRACT

The present invention relates to novel electroactive energy storing polyacetylene-copolysulfur (PAS) materials of general formula $(C_2S_x)_n$ wherein x is greater than 1 to about 100, and n is equal to or greater than 2. This invention also relates to novel rechargeable electrochemical cells containing positive electrode materials comprised of said polyacetylene-co-polysulfur materials with improved storage capacity and cycle life at ambient and sub-ambient temperatures.

33 Claims, No Drawings

ELECTROACTIVE HIGH STORAGE CAPACITY POLYACETYLENE-CO-POLYSULFUR MATERIALS AND ELECTROLYTIC CELLS CONTAINING SAME

BACKGROUND OF THE INVENTION

This invention relates to novel electroactive energy storing polyacetylene-co-polysulfur (PAS) materials of general formula $(C_2S_x)_n$ wherein x is greater than 1 to about 100, and n is equal to or greater than 2. This invention also relates to novel rechargeable electrochemical cells containing positive electrode materials comprised of said polyacetylene-co-polysulfur materials with improved storage capacity at ambient and sub-ambient temperatures.

Batteries are used in almost all portable consumer electronic products from flash lights to lap top computers. Over the years, considerable interest has been shown in developing lighter weight high energy-density rechargeable batteries for many applications including electric vehicles. In this regard, thin film solid state batteries using the polyacetylene-co-polysulfur cathode materials of this invention are particularly well suited for use in many consumer applications because of their high energy to weight ratio.

Two main types of cathode materials used in the manufacture of thin film lithium and sodium batteries are known in the art. The first materials include transition metal chalcogenides, such as titanium disulfide with alkali metals as the anode. For example, among the cathode active chalcogenides, U.S. Pat. No. 4,049,879 lists transition metal phosphorous chalcogenides. Other U.S. patents, such as U.S. Pat. Nos. 4,143,214, 4,152,491 and 4,664,991 describe cells wherein the cathode is a carbon/sulfur based material, generally of the $C_xS$ formula where x is typically 10 or larger.

U.S. Pat. No. 4,143,294 to Chang, et al. describes cells having cathodes containing $C_xS$ wherein x is a numerical value from about 4 to about 50. U.S. Pat. No. 4,152,491 to Chang et at. relates to electric current producing cells where the cathode-active materials include one or more polymer compounds having a plurality of carbon monosulfide units. The carbon monosulfide unit is generally described as $(CS)_x$, wherein x is an integer of at least 5, and may be at least 50, and is preferably at least 100. In both cells developed by Chang, et al. the energy storage capacity is limited because there is a low density of sulfur-sulfur bonds.

U.S. Pat. No. 4,664,991 to Perichaud, et al. describes a substance containing a one-dimensional electric conducting polymer and at least one polysulfurated chain forming a charge-transfer complex with the polymer. Perichaud, et al. use a material which has two components. One is the conducting polymer, which is selected from a group consisting of polyacetylenes, polyparapheniylenes, polythiophenes, polypyrroles, polyanilines and their substituted derivatives. The other is a polysulfurated chain which is in a charge transfer relation to the conducting polymer. The polysulfurated chain is formed by high temperature heating of sulfur with the conjugated polymer. As a result of using this material, the cell of Perichaud, et at. exhibits a fairly low voltage of only 2.0 V against lithium.

In a related approach, a PCT application (PCT/FR84/00202) of Armand et al. describes derivatives of polyacetylene-co-polysulfurs comprising units of $R_x(CS_m)_n$ wherein R is hydrogen, alkali metal, or transition metal, x has values ranging from 0 to values equal to the valence of the metal ion used, values for m range from greater than 0 to less than or equal to 1, and n is unspecified. ;Structures proposed for these materials are of the type:

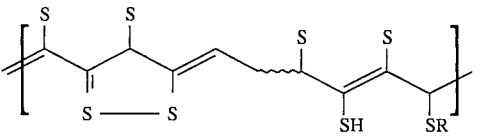

and

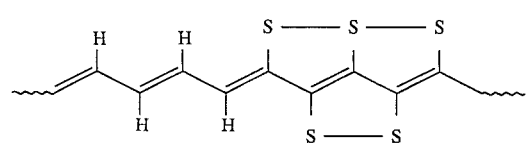

wherein such materials are derived from the reduction of polytetrafluoroethylene or polytrifluorochloroethylene with alkali metals in the presence of sulfur, or by the sulfuration of polyacetylene with vapors of sulfur monochloride at 220° C. Although these materials are electrochemically active, they suffer from low storage capacity owing to low SIC ratios and a limited number of S-S bonds in the materials. These materials can have a considerable amount of residual hydrogen, fluorine, and chlorine atoms in their backbones depending on the method of synthesis.

U.S. Pat. Nos. 4,833,048 and 4,917,974 to De Jonghe, et al. describe a class of cathode materials made of organosulfur compounds of the formula $(R(S)_y)_n$ where y=1 to 6; n=2 to 20, and R is one or more different aliphatic or aromatic organic moieties having one to twenty carbon atoms. One or more oxygen, sulfur, nitrogen or fluorine atoms associated with the chain can also be included when R is an aliphatic chain. The aliphatic chain may be linear or branched, saturated or unsaturated. The aliphatic chain or the aromatic rings may have substituent groups. The preferred forfit of the cathode material is a simple dimer or $(RS)_2$. When the organic moiety R is a straight or a branched aliphatic chain, such moieties as alkyl, alkenyl, alkynyl, alkoxyalkyl, alkythioalkyl, or aminoalkyl groups and their fluorine derivatives may be included. When the organic moiety comprises an aromatic group, the group may comprise an aryl, arylalkyl or alkylaryl group, including fluorine substituted derivatives, and the ring may also contain one or more nitrogen, sulfur, or oxygen heteroatoms as well.

In the cell developed by De Jonghe, et al. the main cathode reaction during discharge of the battery is the breaking and reforming of disulfide bonds. The breaking of a disulfide bond is associated with the formation of an $RS^-M^+$ ionic complex. The organo-sulfur materials investigated by De Jonghe, et al. undergo polymerization (dimerization) and de-polymerization (disulfide cleavage) upon the formation and breaking of the disulfide bonds. The depolymerization which occurs during the discharging of the cell results in lower weight monomeric species which can dissolve into the electrolyte, thereby severely reducing the utility of the organo-sulfur material as cathode-active material. The result is an unsatisfactory cycle life having a maximum of about 200 deep discharge-charge cycles, more typically less than 100 cycles as described in *J. Electrochem Soc.*, Vol. 138, pp. 1891–1895 (1991). In particular, the organo-sulfur materials developed by De Jonghe, et al., are highly unstable in the presence of high conductivity liquid, plasticized polymer, or gel electrolytes.

A significant additional drawback with the organo-sulfur materials developed by De Jonghe, et al. is the slow kinetics of oxidation and reduction at ambient temperatures, severely reducing the power output of cells incorporating cathodes made with these organo-sulfur materials. The slow kinetics result from the oxidation and reduction being related to the formation and breaking, respectively, of disulfide bonds on non-conjugated, non-conductive materials.

Despite the various approaches proposed for organo-sulfur cathode materials, there remains a need for inexpensive cathode materials having high storage capacity, high discharge rates and very long cycle lives at ambient and sub-ambient temperatures.

It is, therefore, a primary object of this invention to provide new polyacetylene-copolysulfur based cathode materials for thin film solid state batteries which are inexpensive, yet avoid the limitations existing in the prior art, while offering performance characteristics much higher than those of known materials.

It is another object of this invention to provide new cathode materials having as the active material polyacetylene-co-polysulfur (PAS) polymers which do not undergo polymerization and de-polymerization upon oxidation and reduction.

It is yet another object of this invention to provide a method of making a solid state rechargeable battery including the novel cathode of the invention.

SUMMARY OF THE INVENTION

It is an object of the present invention to provide a novel electroactive energy storing polyacetylene-co-polysulfur (PAS) material useful as a solid state cathode material in rechargeable batteries. In its fully charged or oxidized state, the PAS material can be represented by the formula I, $$+C_2S_x+_n \qquad \text{I}$$

wherein x ranges from greater than 1 to about 100, n is equal to or greater than 2, and said PAS material does not contain aliphatic or aromatic moieties. Said PAS material is further characterized by the incorporation of large fractions of polysulfur components, which on electrochemical reduction in an electrolytic cell, provides the exceptionally high storage capacity per unit weight of material. In contrast to materials presently known in the art, the PAS materials of the present invention undergo oxidation and reduction with the formation and breaking, respectively, of multiple sulfur-sulfur bonds which are attached to conjugated polymer backbone structures that provide good electron transport and fast electrochemical kinetics at ambient temperatures and below. Said PAS materials when used as cathode materials in battery cells, may be optionally mixed with conductive components and binders to further improve electrochemical recycleability and capacity of said cathode active material.

One embodiment of the present invention relates to PAS compositions of formula I prepared by the reaction of acetylene with a metal amide, such as sodium amide or sodium diisopropylamide, and elemental sulfur in a suitable solvent, such as liquid ammonia. Although the detailed structure of such PAS materials has not been completely determined, available structural information suggests that these compositions are comprised of one or more of the structural units of formulas II–VII;

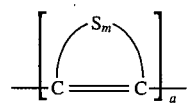

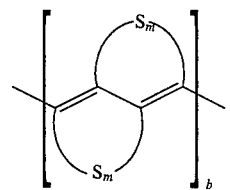

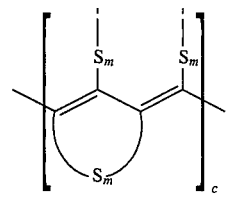

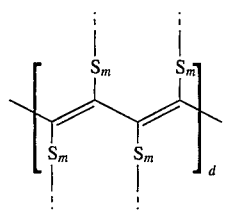

wherein m is the same or different at each occurrence and is greater than 2; and the relative amounts of a, b, c, d, e, and f in said PAS materials can vary widely and will depend on the method of synthesis. Preferred compositions are those wherein m is greater than 3, and especially preferred compositions are those wherein m is on the average equal to or greater than 6. A key feature of these compositions is that electrochemical reduction and oxidation need not lead to depolymerization and repolymerization of the polymeric backbone. Further, the polymer backbone structure contains conjugated segments which may facilitate electron transport during electrochemical oxidation and reduction of the polysulfur side groups, wherein electrochemical reduction and oxidation of the conjugated backbone segments does not occur. PAS materials of the present invention typically have elemental compositions containing between about 50 wt. % and 98 wt. % sulfur. Preferred PAS compositions are those that have elemental compositions containing between about 80 wt. % and 98 wt. % sulfur.

It is another object of this invention to provide a rechargeable, solid state electric current producing cell capable of operating at ambient temperatures and below, which is comprised of:

(a) an anode which is comprised of one or more alkali or alkaline earth metals;

(b) a novel cathode having as the cathode active material one or more polyacetylene-copolysulfur compounds which can be formulated as $(C_2S_x)_n$ wherein x is from greater than 1 to about 100, and n is greater than or equal to 2; and (c) an electrolyte which is chemically inert with respect to the anode and the cathode and which permits the transportation of ions between the anode and the cathode.

The anode material may be an elemental alkali metal or an alkali-metal alloy including the mixture of an elemental alkali metal and one or more alloys made from an element selected from the Periodic Table Group IA and IIA metals.

Lithium and sodium are useful materials for the anode of the battery of the invention. The anode may also be alkali-metal intercalated carbon such as $LiC_x$ where x is equal to 6 or greater. Also useful as anode materials of the present invention are alkali-metal intercalated conjugated polymers, such as lithium, sodium or potassium doped polyacetylene, polyphenylene, and the like.

The cathode employed in the battery of the invention as the cathode active material is comprised of a PAS material of the formula $(C_2S_x)_n$, wherein x is from greater than 1 to about 100, and n is a numerical value greater than or equal to 2, and preferably greater than 10.

The electrolytes used in the battery cells of the present invention function as separator materials between the anodes and cathodes as well as a medium for storage and transport of ions. In principle, any liquid, solid, or solid-like material capable of storing and transporting ions may be used. Particularly preferred are solid electrolyte separators comprised of polyethers, polyimides, polyphosphazenes, polyacrylonitriles (PAN), polysiloxanes, polyether grafted polysiloxanes, blends of the foregoing, derivatives of the foregoing, copolymers of the foregoing, crosslinked and network structures of the foregoing, and the like to which is added an appropriate electrolyte salt.

A variety of solid gel-type electrolytes are also useful in the practice of this invention. Illustrative of useful gel-type electrolytes are polyacrylonitriles, sulfonated polyimides, cured divinyl polyethylene glycols, cured polyethylene glycol-bis-(methyl acrylates), and cured polyethylene glycol-bis-(methyl methacrylate) which have been swollen with propylene carbonate (PC), ethylene carbonate (EC), glymes, low molecular weight polysiloxanes, and mixtures thereof.

Especially useful solid and gel-type electrolytes are those comprising divinyl polyethylene glycols, polyethylene glycol-bis-(methyl acrylates), or polyethylene glycol-bis-(methyl methacrylate) which has been cured (crosslinked) using UV, x-ray, gamma ray, electron beam, or other ionizing radiation.

It is another object of this invention to provide a method of making the solid state batteries incorporating the novel cathode materials of the present invention. The method of making the cells of the present invention is particularly preferred for use in applications requiting high energy storage capacity.

It is still another object of this invention to provide solid state batteries having higher specific energy and higher current than has been previously achieved with organo-sulfur cathode materials.

It is a further object of this invention to provide batteries having long shelf life and a low rate of self-discharge.

These and other objects of this invention will be apparent from the following description and the accompanying drawings.

BRIEF DESCRIPTION OF THE DRAWINGS

FIG. 1 shows a cyclic voltammogram of PAS (made from the polymerization of acetylene in the presence of a metal amide and sulfur) in an electrolyte consisting of dimethylsulfoxide with 0.1 molar concentration of tetraethylammonium perchlorate at a sweep rate of 50 mV/sec at room temperature.

FIG. 2 shows the cyclic voltammogram of $((C_2H_5)_2NCSS)_2$ in an electrolyte consisting of dimethylsulfoxide with 0.1 molar concentration of tetraethylammonium perchlorate at a sweep rate of 50 mV/sec at room temperature.

DETAILED DESCRIPTION OF THE INVENTION

The cyclic voltammograms shown in FIGS. 1–2 illustrate the fundamental difference between PAS materials of the present invention and organo-sulfur materials disclosed in the art whose electrochemical activity is based on breaking and reforming of disulfide bonds. In the case of PAS materials the oxidation and reduction peaks are closely aligned on the voltage axis indicative of fast, reversible electrochemical kinetics. In the case of $((C_2H_5)_2NCSS)_2$, which is representative of the materials disclosed by De Jonge et al. containing disulfide bonds, and which polymerizes (dimerizes) and de-polymerizes (cleaves) by the forming and breaking of said disulfide bonds, respectively, during electrochemical oxidation and reduction, there is a spread of about 2 volts between the oxidation and the reduction peaks. This is indicative of very slow electrochemical kinetics associated with bond breaking and formation.

It is clear from these experimental results that PAS behaves like a conjugated polymeric material which is fundamentally different in its structure and electrochemical function compared with the mate,rials developed by De Jonghe et al. and Armand et at. This fundamental difference structurally and electronically is the cause for the substantially higher capacity and much improved electrochemical kinetics at room temperature.

Novel rechargeable battery cells of the present invention comprise three essential components. One essential component is an anode material. The anode may comprise any metal capable of functioning as a negative electrode in combination with the cathode materials of the present invention. Illustrative of useful anode materials of this invention are one or more metals selected from the group consisting of metals belonging to Group IA and Group IIA in the Periodic Table of the elements, such as lithium, sodium, potassium, magnesium, calcium, and the like. Also useful in the practice of this invention are anodes comprised of alloys, mixtures, composites, intercalated carbons, intercalated conjugated polymers, and the like, of the aforementioned alkali and alkaline earth metals. Illustrative of such compositions are sodium-lithium alloys, lead-sodium alloys, lithium-fin alloys, lithium-silicon alloys, lithium intercalated carbons, lithium doped polyacetylene, sodium doped polyphenylene, and lithium intercalated graphite. Preferred anodes in the practice of this invention are those comprised of alkali metals. More preferred are those comprised of lithium and/or sodium. Most preferred are anodes comprised of lithium foils of thickness from about 2 microns to about 250 microns.

Another essential component in the novel battery cells of the present invention is a cathode material comprised of a polyacetylene-co-polysulfur material of general formula I;

$$\mathrm{+C_2S_x+_n} \qquad \qquad I$$

wherein x can range from greater than 1 to about 100, and n is equal to or greater than 2. Preferred anode materials are those wherein x is greater than 2, and n is equal to or greater than 5. Particularly preferred cathode materials are those wherein x is equal to or greater than 6, and n is greater than 5.

Also illustrative of useful cathode materials of the present invention are composite cathodes comprised of:

(a) PAS materials of formula I, (b) a non-aqueous electrolyte, and (c) a conductive filler.

Useful non-aqueous electrolytes in said composite cathodes can be the same or different from those used in the construction of complete battery cells. A complete description of useful electrolytes in the composite cathodes of the present invention is presented below.

Useful conductive fillers are any conductive materials that can enhance the electrical connectivity between the current collectors and the electroactive cathode components in the cell. It is desirable that said conductive fillers be inert to the components of the cell under the intended operating conditions of the cell. Particularly preferred conductive fillers are conductive carbons; conductive acetylene blacks; graphites; metal powders, flakes and fibers; and electrically conductive polymers such as polyanilines, polyacetylenes, polypyrroles, polythiophenes, polyphenylenes, polyphenylene-vinylenes, polythienylene-vinylenes, and derivatives thereof. Additionally, composite cathodes useful in this invention may contain other polymeric or non-polymeric binder materials that facilitate the formation, fabrication, and assembly of battery cells in desired configurations. Such optional materials are known to those skilled in the art of cathode fabrication an include materials such as polytetrafluoroethylene and other fluorinated polymers, SBR rubbers, EPDM rubbers, and the like.

The third essential component of the battery cells of the present invention is an electrolyte. Illustrative of useful electrolytes in the practice of this invention are electrolytes that are chemically and electrochemically inert with respect to the anode and cathode materials and which permit the migration of ions between the anode and cathode at desired use temperatures. Preferred electrolytes are those that allow for transport of ions at ambient temperatures and below. Particularly preferred are those capable of operating between about −40° C. and +120° C.

Electrolyte systems which have application to both lithium and sodium based rechargeable batteries can be employed in the fabrication of the cell of the invention, such as solid polymer electrolytes; single-ion conducting polymer electrolytes, high conductivity gel polymer electrolytes, and liquid organic electrolytes. Particularly useful electrolytes for use in cells of the present invention are single ion conducting polymer electrolytes with highly delocalized anionic moieties covalently attached to the polymer backbone to achieve high specific lithium ion conductivity, as described in U.S. Pat. No. 4,882,243. The advantages of polymer electrolytes with exclusive cation conduction are reduced cell polarization deriving from low anion mobility, reduced volume changes in the cathode from intercalation of ion clusters, and reduced salt-induced corrosion on the current collectors. Room temperature conductivities for single ion conducting polymer electrolytes described in U.S. Pat. No. 4,882,243 are in the range of $10^-$ to $10^{-5}$ S/cm.

A variety of gel-polymer electrolytes have been discovered to be useful in the practice of this invention. These electrolytes consist of a high molecular weight polymer matrix into which is dissolved an electrolyte salt, then subsequently swollen with a low molecular weight liquid which effectively acts as a plasticizer for the salt-polymer matrix. These low molecular weight liquids are referred to as gelation agents and are generally common organic solvents or liquid oligomers. Any organic liquid capable of swelling said salt-polymer matrix can be used as a gelation agent so long as it is stable to the selected cathode and anode in the battery cell. A substantial increase in electrolyte conductivity can be achieved by introducing these gelation agents into said salt-polymer blends.

Illustrative of useful polymer matrices for gel polymer electrolytes in high energy density batteries of the present invention are those derived from polyethylene oxides, polypropyleric oxides, polyacrylonitriles, polysiloxanes, polyimides, polyethers, sulfonated polyimides, Nafion™ resins, divinyl polyethylene glycols, polyethylene glycolbis-(methyl acrylates), polyethylene; glycol-bis(methyl methacrylate), blends of the foregoing, derivatives of the foregoing, copolymers of the foregoing, crosslinked and network structures of the foregoing, and the like. Useful ionic electrolyte salts for gel-polymer electrolytes include $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

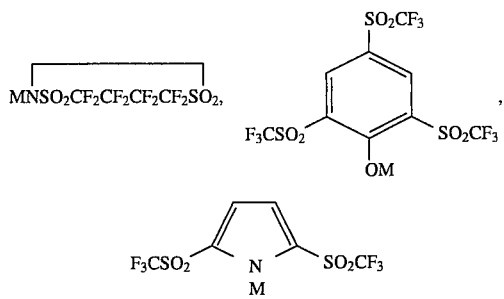

and the like, where M is Li or Na. Other electrolytes useful in the practice of this invention are disclosed in U.S. patent application Ser. No. 192,008.

Useful gelation agents for gel-polymer electrolytes include ethylene carbonate (EC), propylene carbonate (PC), N-methyl acetamide, acetonitrile, sulfolane, 1,2-dimethoxyethane, polyethylene: glycols, 1,3-dioxolanes, glymes, siloxanes, and ethylene oxide grafted siloxanes. Particularly preferred gelation agents are those derived from graft copolymers of ethylene oxide and oligomers of poly(dimethyl siloxane) of general formula VIII,

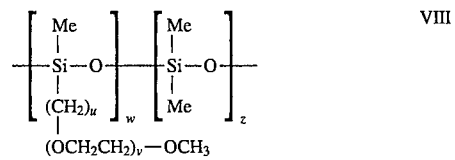

wherein u is an integer equal to or greater than 1, v is an integer equal to or greater than 0 and less than about 30, and the ratio z/w is equal to or greater than 0.

Values for u, v, w, and z can vary widely and depend on the desired properties for said liquid gelation agent. Preferred gelation agents of this type are those wherein u ranges from about 1 to 5, v ranges from about 1 to 20, and the ratio z/w is equal to or greater than 0.5. An especially preferred composition of formula VIII is that in which u is equal to 3, v is equal to 7, and the ratio of z to w is 1.

These liquid gelation agents themselves are useful solvents to form liquid electrolytes which provide other effective electrolyte systems for the cells of the invention. For example, glymes with lithium salts, such as $LiAsF_6$, are useful liquid electrolytes. Likewise, compositions of formula VIII together with $Li(SO_2CF_3)$ are especially useful as liquid electrolytes.

Battery cells comprising PAS cathodes can be made in a variety of sizes and configurations which are known to those skilled in the art. Illustrative of useful battery design configurations are planar, prismatic, jelly-roll, W-fold, and the like. These configurations are not to be construed as limitations on the scope of this invention as other designs are anticipated.

In batteries of the present invention, the main design concerns are the kinetics and chemical and electrochemical reversibility of the reduction/oxidation reactions, the density of available sulfur atoms, and the miscibility of oxidation and reduction products with the polymer electrolyte. During the discharge of the cells of this invention, the PAS polymer is reduced accompanied by the insertion of $Li^+$ ions into the cathode from the electrolyte to maintain charge neutrality. In contrast to the materials disclosed in U.S. Pat. Nos. 4,833,048 and 4,917,974, the polyacetylene-copolysulfur materials of the present invention undergo oxidation and reduction with the formation and breaking of multiple sulfur-sulfur bonds attached to conjugated structures which provide good electron transport and fast electrochemical kinetics at ambient temperatures and below. An advantage of using PAS as the cathode active material is the high density of sulfur atoms which results in a high charge storage density during oxidation-reduction. This is accompanied by a high density of $Li^+$ ions inserted for charge neutrality, resulting in a high capacity.

In contrast to the organo-sulfur materials developed by De Jonghe, et al. PAS need not undergo polymerization/depolymerization upon charge and discharge, thereby maintaining the integrity of the polymer backbone and improving cathode utilization during repeated charge and discharge.

Table 1 summarizes the superior performance of battery cells comprised of PAS anodes of formula I relative to state-of-the-art rechargeable battery systems presently commercialized or under development. The PAS based cells exhibit a volumetric energy density advantage of from 2 to 3 times, and a gravimetric energy density advantage of from 1.7 to 3.5 times better than presently known rechargeable cells in a AA configuration.

TABLE 1

Performance comparisons of PAS based rechargeable cells relative to other advanced rechargeable systems in AA cell configurations

| Electrochemical System | Volumetric Energy Density (Whr/L) | Gravimetric Energy Density (Whr/Kg) |
| --- | --- | --- |
| Li/PAS cells of formula I | 430–500 | 175–260 |
| Lithium Ion | 215 | 100 |
| Nickel Metal Hydride | 180–200 | 60–75 |
| Nickel Cadmium (premium) | 120–140 | 40–50 |

The following specific examples are presented to more particularly illustrate the invention, and should not be construed as limitations on the scope and spirit of the invention.

EXAMPLES

Example 1

Preparation of Polyacetylene-co-Polysulfur From Acetylene and Sulfur

Into 250 mL of liquid ammonia with stirring was added 27.3 g (0.7 mol) of sodium amide. Through this solution was passed acetylene gas for 2.5 hours. To this reaction mixture was then added portion-wise 67.2 g (2.1 tool) of sulfur. The reaction mixture was stirred for an additional 7.5 hours, then 37.45 g (0.7 mol) of ammonium chloride was slowly added. The reaction mixture was allowed to warm to room temperature overnight, then 350 mL of water was added to the residue. The solid product was filtered, washed with water, then washed with acetone, and dried under vacuum. The yield was 59.5 g; elemental analysis indicated 85 wt. % sulfur.

Preparation of Polyacetylene-co-Polysulfur Composite Cathodes

Example 2

A mixture of 50% by weight PAS prepared by the general procedure of Example 1, 20% polyethylene oxide-$LiSO_3CF_3$ and 30% acetylene black was suspended in acetonitrile/isopropanol (1:2) to form a slurry. The slurry was ground into fine particles and was then cast as a film 25–100 μm thick on a 25 μm thick nickel foil. The entire unit was dried in a vacuum oven at 40° C.–80° C. for 24 hours.

Example 3

A mixture of 40% by weight PAS from example 1, 45% by weight electrolyte and 15% acetylene black was suspended in acetonitrile to form a slurry. The electrolyte was a gel electrolyte made from polyethylene oxide, propylene carbonate, ethylene carbonate, and $LiSO_3CF_3$. The slurry was finally ground and then cast as a film onto a nickel foil. The entire unit was then dried in a vacuum oven at 40° C.–80° C. for 24 hours.

Preparation of Rechargeable Batteries

Example 4

A rechargeable lithium battery of unipolar sandwich design was prepared by sandwiching a polymer electrolyte of about 25 micron thickness between a lithium foil of 125 micron thickness and the composite cathode (example 3) of about 25–75 microns thick. To obtain laboratory prototype cells, the above components were sandwiched between two stainless steel circular disks having 0.5 cm thickness. A typical material used for the anode was lithium metal. The PAS of the invention prepared in accordance with the procedure of Examples 1 was used for the cathode. The electrolyte employed in preparing the battery of this example was a branched polysiloxane containing grafted ethylene oxide side chains (formula VIII, u=3, v=7, z/w=1, molecular weight of 1000) and a $LiSO_3CF_3$ salt.

Example 5

Following the general procedure of Example 4, a rechargeable lithium/polymer electrolyte/PAS battery was prepared, using the composite cathode of example 2, a lithium foil anode, 9.8 mg of polymer gel electrolyte and 2.3 mg of ultrafine graphite powder. The composite anode contained 7.1 mg of PAS. The polymer gel electrolyte contained polyacrylonitrile, ethylene carbonate, propylene carbonate and $LiCO_4$ with a conductivity of $3 \times 10^{-3}$ S/cm at 25° C.

Example 6

Another rechargeable lithium cell was prepared having a composite cathode containing 5.4 mg of polymer gel electrolyte, 12.0 mg of PAS of Example 1 and 1.9 mg of graphite powder. Assuming a mid cell potential of 2.5 V, a storage energy of 12.6 mWh was obtained.

Example 7

A rechargeable lithium battery was prepared having a lithium foil of 125 micron thickness, a fiber reinforced 1 M LiClO$_4$ in propylene carbonate/dimethoxyethane electrolyte and the PAS-based composite cathode of example 2. The cathode contained 50% by weight PAS, 40% by weight PAN, and 10% by weight acetylene black. The battery prepared for this example exhibited about 500 cycles with a maximum cathode capacity loss of 10% compared to the first cycle. The cells were subjected to a twenty minute quick discharge/charge cycle without any rest period by trial and error method to choose the appropriate voltage and current limits. The average material utilization during the first 200 cycles was 72% and about 60% between the 250th and 425th cycle. The cycle efficiency defined as the ratio between charge output (discharge) and charge input (charge) to thee cell during one complete cycle was close to unity up to 200 cycles. After about the 475th cycle, when the capacity of the cell declined by 5%, the battery cycling was disrupted to measure the cell impedance. A low cell impedance was observed which ruled out limitations under cathode/electrolyte interface. The declining cathode capacity after 500 cycles was attributed to the possible formation of soft dendrites at the lithium anode-polymer electrolyte interface; therefore, these cells have been classified as anode performance limited battery systems.

Example 8

A rechargeable lithium battery was prepared having a lithium foil anode of 125 micron thickness, a polyethylene oxide (PEO)/LiSO$_3$CF$_3$ solid electrolyte along with a siloxane (from Example 4)/LiSO$_3$CF$_3$ liquid electrolyte, a composite cathode containing 50 wt. % PAS from Example 1 along with 30 wt. % conductive carbon and 20 wt. % of the PEO/LiSO$_3$CF$_3$ electrolyte, wherein the anode and cathode were separated with Celgard™ 2500. This 1 cm×1 cm planar battery exhibited 103 cycles at a charge/discharge current of 0.05 mA/cm$^2$ with a capacity of 729 mAhr/g for the first several cycles, which then decayed to a final capacity of 243 mAhr/g at cycle 103.

Example 9

A rechargeable lithium battery was prepared having a lithium foil anode of 125 micron thickness, a composite cathode containing 50 wt. % PAS from example 1 along with 30 wt. % conductive carbon and 20 wt. % of PEO/LiSO$_3$CF$_3$ electrolyte, a solid freestanding film electrolyte of polyethylene glycol-bis-(methyl methacrylate)/siloxane/LiSO$_3$CF$_3$ which was UV cured (crosslinked), and to the cell was added a small amount of liquid electrolyte containing siloxane (from Example 4)/LiSO$_3$CF$_3$. This 1 cm×1 cm planar battery was charged and discharged at a current density of 0.05 mA/cm$^2$ and exhibited a capacity of 1324 mAhr/g for the first several cycles, which then decayed to a final capacity of 296 mAhr/g at cycle 56.

Example 10

A composite cathode was prepared from a physical mixture of 48 wt. % PAS material from example 1, 12 wt. % of polyaniline powder in the form of Versicon™ manufactured by Allied-Signal, Inc., 20 wt. % acetylene black, and 20 wt. % polymer electrolyte. The polymer electrolyte used to form the composite cathode consisted of a mixture of poly(ethylene oxide) and a branched polysiloxane with ethylene oxide side chains (polysiloxane-graft-(ethylene oxide)7) and LiClO$_4$ in the ratio of 24 ethylene oxide units per lithium. The polymer electrolytes were dissolved in acetonitrile and added to the mixture of PAS, polyaniline and acetylene black to form a viscous slurry. Composite cathodes of thickness approximately 100 microns were cast onto Ni foil substrates and the solvent evaporated. Cells were assembled containing composite cathodes, branched polysiloxane electrolytes and lithium foil anodes. The open circuit potentials of the cells were about 3.23 volts.

Preparation of Polyacetylene-co-polysulfur From Acetylene and Sulfur

Example 11

A solution of Na (2.3 g) in liquid ammonia (200 ml) in the presence of FeCl$_3$ was stirred until the blue color disappeared. Afterwards, acetylene was passed through the solution for 2 hours (50–70 ml/min) and then 9.6 g of sulfur was added portionwise during 1 hour. The mixture was stirred for 2 hours, poured off from the the unreacted sulfur (1.41 g), quenched with NH$_4$Cl (5.35 g) and left to staid open to evaporate ammonia. The residue was poured with water (200 ml) and the polymer was filtered off, washed with water until the negative reaction for Cl ion was fixed and then washed with acetone and dried to furnish 1.0 g of a black polymer (S 65.6%). The aqueous filtrate was diluted up to 450 ml and boiled with 4.5 g of azobisisobutyronitrile (a radical initiator) for 4 hours. The black carbon-like polymer was filtered off, washed and dried (3.36 g, S 77.9%). The filtrate was acidified with concentrated HCl up to pH ca. 2 and the polymer precipitate was filtered off, washed and dried as above (1.5 g, S 60.1%).

Example 12

To a solution of 24 g Na$_2$S×9H$_2$O in 50 ml of ethanol/water (1:1) was added 14.4 g of sulfur. The mixture was stirred at room temperature for 1 hour. The solvent was removed under vacuum. The residue was dissolved in 150 ml of DMF, and to the resulting solution was added 8.61 g of hexachlorobutadiene. The reaction mixture was stirred for 1 hour, and poured into 300 ml of water. The precipitated product was filtered, washed with water, acetone, methanol, and dried trader vacuum. Yield 17.11 g; mp 90°–96° C.

The performance characteristics of the cells prepared in Examples 6, 7, 8, and 9 demonstrate that by using the cathode of the invention a very high cathode utilization is readily achieved resulting in energy capacity storage much higher than those achieved by commercially available batteries.

What is claimed is:

1. An electrochemically active polyacetylene-co-polysulfur material, which in its oxidized state, is of the general formula I

    I wherein x ranges from greater than 1 to about 100, and
n is greater than or equal to 2, and said polyacetylene-co-polysulfur material does not contain aliphatic or aromatic moieties.

2. The material of claim 1 wherein said polyacetylene-co-polysulfur electroactive material is of formula I, wherein x is greater than 2 and n is greater than 5.

3. The material of claim 1 wherein said polyacetylene-co-polysulfur electroactive material is of formula I, wherein x is greater than or equal to about 6 and n is greater than or equal to about 10.

4. The polyacetylene-co-polysulfur material of claim 1 obtained from the polymerization of acetylene in the presence of a metal amide and sulfur.

5. The, polyacetylene-co-polysulfur material of claim 1 wherein said material of general formula I is comprised of one or more of the structural units of formulas II–VII,

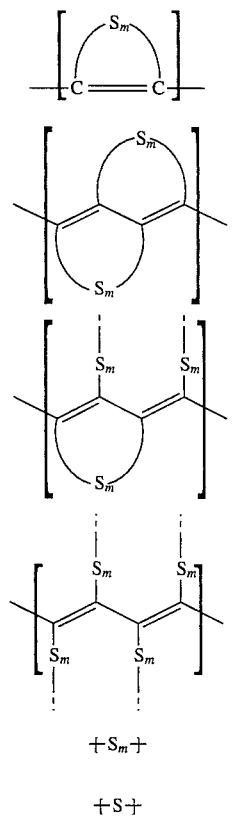

$$+S_m+ \quad\quad VI$$

$$+S+ \quad\quad VII$$

wherein m is the same or different at each occurrence and is greater than 2.

6. The composition of claim 5 wherein m is the same or different at each occurrence and is greater than 3.

7. The composition of claim 5 wherein m is the same or different at each occurrence and is equal to or greater than 6.

8. The composition of claim 1 which upon electrochemical reduction and oxidation does not undergo depolymedzation and repolymerization of the polymer backbone.

9. An electric current producing cell comprising:

(a) an anode comprised of a metal selected from the group consisting of metals belonging to group IA and group IIA of the Periodic Table of the elements;

(b) a cathode material comprised of a polyacetylene-co-polysulfur material of the general formula I, $$+C_2S_x+_n \quad\quad I$$

wherein values for x can range from greater than 1 to about 100, and n is equal to or greater than 2; and (c) an electrolyte.

10. The cell of claim 9 wherein said electrolyte provides an operating temperature range for the cell of –40° C. to +120° C.

11. The cell of claim 9 wherein said electrolyte provides an operating temperature range for the cell of –20° C. to +100° C.

12. The cell of claim 9 wherein said electrolyte provides an operating temperature range for the cell of 0° C. to +100° C.

13. The cell of claim 9, wherein said anode material is comprised of one or more materials selected from the group of alkali metals, alkaline earth metals, alloys containing alkali metals, carbons intercalated with alkali metals, and conjugated polymers intercalated with alkali metals.

14. The cell of claim 9 wherein said anode material is comprised of one or more materials selected from the group consisting of lithium-aluminum alloys, lithium intercalated carbons, sodium intercalated carbons, sodium-lead alloys, lithium-lead alloys, lithium-tin alloys, lithium-silicon alloys, lithium-aluminum alloys, lithium doped polyacetylenes, sodium doped polyacetylenes, sodium doped polyphenylenes, and lithium doped polyphenylenes.

15. The cell of claim 9 wherein said cathode material is comprised of a polyacetylene-copolysulfur material of general formula I, wherein x ranges from about 3 to about 100, and n is greater than 5.

16. The cell of claim 9 wherein said cathode material is comprised of a polyacetylene-copolysulfur material of general formula I, wherein x is equal to or greater than 6 but less than about 100, and n is greater than 5.

17. The cell of claim 9 wherein said cathode material is comprised of a polyacetylene-copolysulfur polysulfur obtained from the polymerization of acetylene in the presence of a metal amide and sulfur.

18. The cell of claim 9 wherein said cathode material is comprised of one or more of the structural moieties of formulas II–VII:

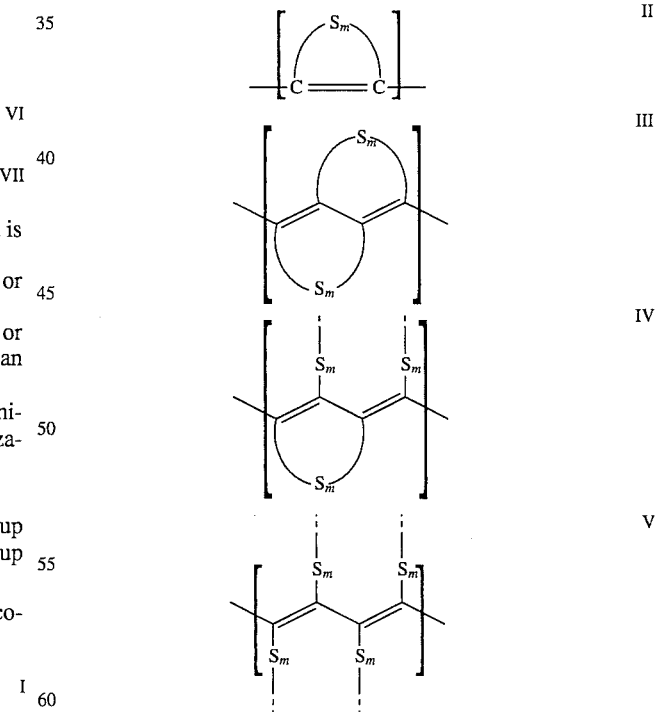

$$+S_m+ \quad\quad VI$$

$$+S+ \quad\quad VII$$

where, in m is the same or different at each occurrence and is greater than 2.

19. The cell of claim 18 wherein m is the same or different at each occurrence and is greater than 3.

20. The cell of claim 18 wherein m is the same or different at each occurrence and is equal to or greater than 6.

21. The cell of claim 9 wherein said cathode material does not undergo polymerization and depolymerization of the polymer backbone on charging and discharging the cell.

22. The cell of claim 9 wherein said cathode material is a composite cathode comprised of a polyacetylene-co-polysulfur material of general formula I where x is greater than 1 to about 100, and n is equal to or greater than 2; and one or more of the materials selected from the group consisting of non-aqueous electrolytes, conductive fillers, and inert binders.

23. The cell of claim 22 wherein said composite cathode comprises a conductive filler selected from the group consisting of conductive carbons, graphites, conductive acetylene blacks, metal powders, metal flakes, metal fibers, and electrically conductive polymers.

24. The cell of claim 23 wherein said electrically conductive polymer is one or more polymers selected from the group of polyanilines, polyacetylenes, polypyrroles, polythiophenes, polyphenylenes, polyphenylene-vinylenes, polythienylene-vinylenes; and their derivatives.

25. The cell of claim 23 wherein said composite cathode comprises one or more binders selected from the group consisting of polytetrafluoroethylene, fluorinated polymers, EPDM rubber, and SBR rubber.

26. The cell of claim 9 wherein said electrolyte is one or more materials selected from the group consisting of solid polymer electrolytes, single-ion-containing polymer electrolytes, gel polymer electrolytes, and liquid electrolytes.

27. The cell of claim 26 wherein said electrolyte is a solid electrolyte comprised of one or more materials selected from the group of polysiloxanes, polyphosphazines, polyethylene oxides, polypropylene oxides, polyacrylonitriles, polyimides, divinyl polyethylene glycols, polyethylene glycol-bis-(methyl acrylates), polyethylene glycol-bis-(methyl methacrylate); copolymers of the foregoing; derivatives of the foregoing; and crosslinked and networked structures of the foregoing.

28. The cell of claim 26 wherein said electrolyte is comprised of one or more single-ion-conducting polymer electrolytes substituted with anionic moieties covalently attached to the polymer backbone.

29. The cell of claim 26 wherein said gel-polymer electrolyte is comprised of one or more materials selected from the group consisting of polyethylene oxides, polypropylene oxides, polyacrylonitriles, polysiloxanes, polyphosphazines, polyimides, sulfonated polyimides, Nation™ resins, sulfonated polystyrenes, divinyl polyethylene glycols, polyethylene glycol-bis-(methyl acrylates), polyethylene glycol-bis(methyl methacrylate); blends of the foregoing; derivatives of the foregoing; copolymers of the foregoing; and crosslinked and network structures of the foregoing; to which has been added one or more gel-forming agents selected from the group of ethylene carbonate, propylene carbonate, acetonitrile, N-methyl acetamide, sulfolane, 1,2-dimethoxyethane, polyethylene glycols, 1,3-dioxanes, glymes, siloxanes, polyethylene oxide grafted siloxanes, and methoxytetrahydrofuran; and which said gel electrolyte further comprises one or more ionic salts selected from the group consisting of $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

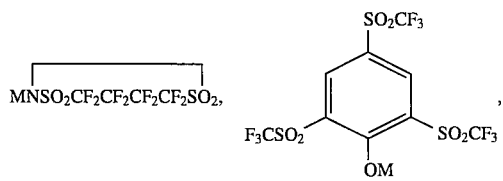
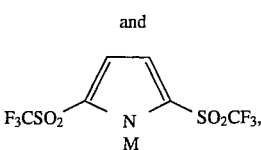

where M is Li or Na.

30. The cell of claim 29 wherein said gel forming agent is comprised of a material of formula VII,

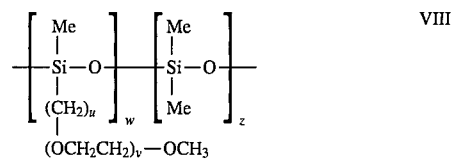

wherein u is an integer equal to or greater than 1, v is an integer equal to or greater than 0 and less than about 30, and the ratio z/w is equal to or greater than 0.

31. The cell of claim 26 wherein said electrolyte comprises one or more alkali-metal salts selected from the group consisting of $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

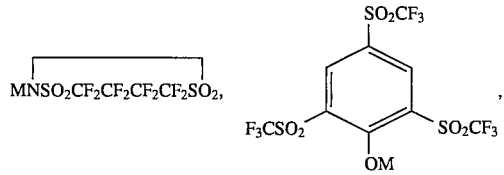
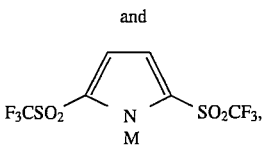

Where M is Li or Na.

32. Am electric current producing cell comprising:

(a) an anode comprising one or more materials selected from the group of alkali metals, alkali metal intercalated carbons, alloys containing alkali metals, and alkali metal doped conjugated polymers;

(b) a cathode material comprised of a polyacetylene-co-polysulfur material of general formula I,

wherein x is greater than 1 to about 100, n is equal to or greater than 2, and said polyacetylene-copolysulfur material is derived from the polymerization of acetylene in the presence of sulfur; and (c) an electrolyte comprised of one or more gel-polymer electrolytes selected from the group consisting of polyethylene oxides, polypropylene oxides, polyacrylonitriles, polyimides, sulfonated polyimides, Nafion™ resins, sulfonated polystyrenes, polyethers, divinyl polyethylene glycols, polyethylene glycol-bis-(methyl acrylates), polyethylene glycol-bis(methyl methacrylate); blends of the foregoing; derivatives of the foregoing; copolymers of the foregoing; and crosslinked and network structures of the foregoing; to which has been added one or more gel-forming agents selected from the group of ethylene carbonate, propylene carbonate, acetonitrile, N-methyl acetamide, sulfolane, 1,2-dimethoxyethane, polyethylene glycols, 1,3-dioxane, glymes, siloxanes, polyethylene oxide grafted siloxanes, and methoxy tetrahydrofuran; and which further comprises one or more ionic salts selected from the group consisting of $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

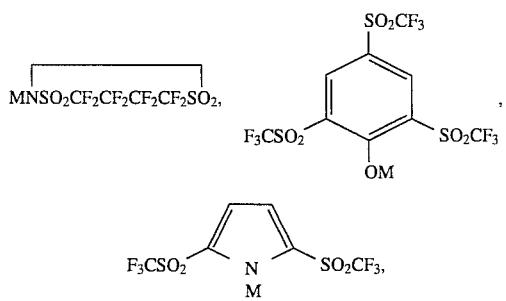

where M is Li or Na.

33. An electric current producing cell comprising:
   (a) an anode comprising one or more metals selected from the group of lithium metal and sodium metal
   (b) a composite cathode comprised of:
      (i) a polyacetylene-co-polysulfur material of general formula $(C_2S_x)_n$, wherein x is greater than 1 to about 100 and n is equal to or greater than 2;
      (ii) an electrolyte comprising an ionic salt selected from the group of $Li(SO_3CF_3)$, $MC(SO_2CF_3)_3$, $MN(SO_2CF_3)_2$,

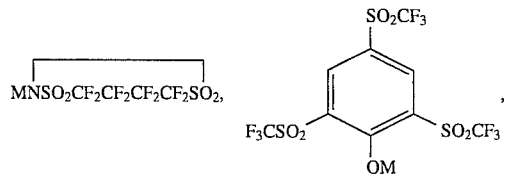

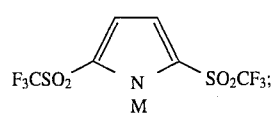

and a polymer comprising a material selected from the group of divinyl polyethylene glycols, polyethylene glycol-bis-(methyl acrylates), and polyethylene glycol-bis(methyl methacrylate) cured by UV, x-ray, gamma ray, electron beam, or other ionizing radiation; polysiloxanes, ethylene oxide grafted siloxanes, and polyethylene oxide; which optionally further contains a liquid gelation agent;
      (iii) a conductive filler selected from the group of conductive carbons, acetylene blacks, and graphite; and
   (c) an electrolyte comprised of one or more materials selected from the group of polysiloxanes, polyphosphazines, polyethers, polyethylene oxides, cured divinyl polyethylene glycols, cured polyethylene glycol-bis-(methyl acrylates), and cured polyethylene glycol bis-(dimethyl acrylates); which electrolyte further comprises a liquid gelation agent and one or more alkali metal salts selected from the group consisting of $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

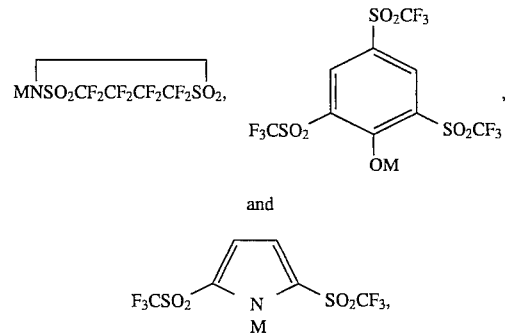

where M is Li or Na.

* * * * *

UNITED STATES PATENT OFFICE
CERTIFICATE OF CORRECTION

Patent No. __5,529,860__  Dated __June 25, 1996__

Inventor(s) __Terje A. Skotheim, Boris Trofimov, Anastasiya G. Malkina and Igor P. Kovalev__

It is certified that error appears in the above-identified patent and that said Letters Patent is hereby corrected as shown below:

TITLE PAGE [75] Inventors:

Correct the spelling of

"Igor P. Koralev" to -- Igor P. Kovalev --

Signed and Sealed this

Third Day of December, 1996

Attest:

BRUCE LEHMAN

Attesting Officer   Commissioner of Patents and Trademarks